US007239955B2

(12) United States Patent
Kraemer et al.

(10) Patent No.: US 7,239,955 B2
(45) Date of Patent: Jul. 3, 2007

(54) METHOD FOR CONTROLLING AN INTERNAL COMBUSTION ENGINE

(75) Inventors: Gerd Kraemer, Baierbrunn (DE); Norbert Klauer, Haimhausen (DE); Frank Strahsen, Fahrenzhausen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 11/520,747

(22) Filed: Sep. 14, 2006

(65) Prior Publication Data

US 2007/0010931 A1 Jan. 11, 2007

Related U.S. Application Data

(63) Continuation of application No. PCT/EP2005/002628, filed on Mar. 11, 2005.

(30) Foreign Application Priority Data

Mar. 16, 2004 (DE) ...................... 10 2004 012 522

(51) Int. Cl.

| | |
|---|---|
| ***F02D 41/08*** | (2006.01) |
| ***F02D 41/10*** | (2006.01) |
| ***F02D 41/14*** | (2006.01) |
| ***F02D 37/02*** | (2006.01) |
| ***G06F 17/00*** | (2006.01) |
| *F02P 5/15* | (2006.01) |

(52) U.S. Cl. ........................ 701/109; 701/103; 701/104

(58) Field of Classification Search ................ 123/478, 123/486, 492, 493, 672, 679, 406.47; 701/101–105, 701/109–111, 115

See application file for complete search history.

(56) References Cited

U.S. PATENT DOCUMENTS 4,751,906 A * 6/1988 Yatabe et al. ............... 123/486
5,144,932 A * 9/1992 Miyashita et al. .......... 123/695
5,385,517 A * 1/1995 Hara et al. .................. 477/169
5,413,078 A * 5/1995 Mitsunaga et al. ......... 123/492

(Continued)

FOREIGN PATENT DOCUMENTS

DE 43 32 099 A1 3/1995

(Continued)

OTHER PUBLICATIONS

International Search Report dated Jun. 28, 2005, including an English translation of the pertinent portions (Four (4) pages).

(Continued)

*Primary Examiner*—Willis R. Wolfe, Jr.
(74) *Attorney, Agent, or Firm*—Crowell & Moring LLP

(57) ABSTRACT

A method is provided for controlling an internal combustion engine operating in a homogenous mode. The internal combustion engine exhibits a control unit for setting the air supply, the fuel supply and the ignition angle. The method reduces the fuel consumption and increases a torque reserve that is to be made available for use. Starting from a specific distribution of air and fuel in the mixture, the air mass to be supplied is increased, which leans the air-fuel mixture such that a first torque reserve is generated. In the event of a positive torque request, the fuel mass to be supplied is increased in order to enrich the air-fuel mixture.

11 Claims, 2 Drawing Sheets

U.S. PATENT DOCUMENTS

| | | | | |
|---|---|---|---|---|
| 5,836,287 | A | 11/1998 | Yano et al. | |
| 6,058,348 | A * | 5/2000 | Ohyama et al. | 701/103 |
| 6,298,300 | B1 * | 10/2001 | Ohyama et al. | 701/103 |
| 6,516,264 | B2 * | 2/2003 | Ohyama et al. | 701/103 |

FOREIGN PATENT DOCUMENTS

| | | | |
|---|---|---|---|
| DE | 196 18 893 | A1 | 11/1997 |
| DE | 198 06 665 | A1 | 8/1999 |
| DE | 101 56 665 | A1 | 9/2002 |
| DE | 101 31 802 | A1 | 1/2003 |

OTHER PUBLICATIONS

German Office Action dated Dec. 1, 2004, including an English translation of the pertinent portions (Five (5) pages).

* cited by examiner

METHOD FOR CONTROLLING AN INTERNAL COMBUSTION ENGINE

CROSS-REFERENCE TO RELATED APPLICATIONS

This application is a continuation of PCT International Application No. PCT/EP2005/002628, filed on Mar. 11, 2005, which claims priority under 35 U.S.C. §119 to German Application No. 10 2004 012 522.8, filed Mar. 16, 2004, the entire disclosures of which are expressly incorporated by reference herein.

BACKGROUND AND SUMMARY OF THE INVENTION

The invention relates to a method for controlling an internal combustion engine—especially for controlling an Otto engine in the event of torque interventions or in idling speed mode.

There already exist a plurality of different methods for controlling an internal combustion engine. Within the scope of an idling speed control of an Otto engine, the output engine torque for holding constant the rotational speed may be changed in both the negative (to reduce the speed) and the positive direction (to raise the speed). Therefore, any torque request that may arise is usually set by adjusting the ignition angle and changing the mass of air and fuel that is to be delivered. To be able to adjust the engine torque with high dynamics also in the positive direction, a so-called torque reserve is used. In so doing, the ignition angle is subsequently shifted in the retard direction in accordance with the torque-optimized ignition angle; and both the air mass to be supplied and also the fuel mass to be supplied are simultaneously increased (e.g., this method is used for controlling the torque with the torque reserve in the internal combustion engine of the BMW 520i model year 2004). Inside this torque reserve, the torque to be generated may be shifted very rapidly by shifting the ignition angle in the direction of the torque-optimized ignition angle. Short-term torque requests may be quickly balanced in this way, and result in only a slight decrease in the idling speed.

However, a torque reserve that is set accordingly results in an increase in the fuel consumption—especially when the internal combustion engine is in an idling mode.

The present invention is based on the problem of providing a method of the above described class that improves upon the amount of the torque reserve and the fuel consumption characteristics.

The invention solves this problem by providing a method for controlling an internal combustion engine operating homogeneously and having a control unit for setting an air mass supply, a fuel mass supply, and the ignition angle, wherein starting from a specific air-fuel ratio ($\lambda$) in the mixture, the air mass to be supplied is increased, and the mixture of air and fuel is leaned to generate a first torque reserve. In the event of a positive torque request, the fuel mass that is to be supplied for enriching the air-fuel mixture is increased.

Owing to the increase in the air mass and the thereby resulting leaning of the air-fuel mixture, a first torque reserve is generated; and then in the event of a positive torque request, the reserved torque is retrieved through the targeted increase in the fuel mass. In particular, a leaning of the mixture is achieved in that if the fuel mass that is made available for use and/or supplied is held constant (e.g., by holding constant the injection period), the air mass is increased. The result is that the output torque of the engine is not changed, but the air-fuel mixture is leaner; and at the same time a significant savings in fuel is achieved in the idle speed mode. Only on the basis of a torque request is the requested torque actually made available within a very short time by enriching the lean mixture of air and fuel to a value in the range of lambda=1. However, it is also contemplated to increase merely the air mass at a disproportionate rate to the fuel mass; then the result would be a simultaneous increase in the current engine torque.

A torque request arises, for example, on a routine basis in the idling mode, when in this case the servo-supported steering is actuated; or the consumers, like the air conditioning system, are switched on. The method, according to the invention, is especially suitable for adjusting an idling speed that is to be held constant. Other torque requests arise in the normal driving mode, when, for example, the gear is to be shifted in an automated manner. Even in the overrun mode a torque reserve is preferably always generated in order to be able to react, if possible without any delay, to the driver's corresponding wishes (load request). So that the torque reserve may be made available for use in all situations, in which a corresponding torque reserve is desired, the operation of the internal combustion engine is monitored by use of a number of different operating parameters, so that when the appropriate operating parameters that signal a pending retrieval of the torque are present, a torque reserve is generated. In all cases the method, according to the invention, guarantees an instantaneous response of the internal combustion engine, and a distinct savings in fuel is achieved, as compared to the prior art methods.

In an especially preferred embodiment of the invention, another torque reserve is achieved in that, if at the same time that the ignition angle is shifted in the retard direction, the fuel mass that is to be made available for use is increased as the air mass increases in an analogous manner. Therefore, if at a constant fuel mass a higher torque reserve is requested than is possible by increasing the air mass owing to the burning limit, the fuel mass is increased in a manner analogous to the air mass that also continues to increase; and at the same time the ignition angle is shifted in the retard direction.

In the event of a fast torque request (or rather in the event that a torque request is to be implemented quickly), the ignition angle is shifted then—viewed temporally—preferably in the early direction at constant lean lambda (lambda>1) until the respective torque-optimized ignition angle (corresponding to the lambda that is set) is set. Not until then is additional fuel supplied until a lambda in the range of lambda=1 is set.

Other objects, advantages and novel features of the present invention will become apparent from the following detailed description of the invention when considered in conjunction with the accompanying drawings.

DETAILED DESCRIPTION OF THE DRAWINGS

Figure 1:
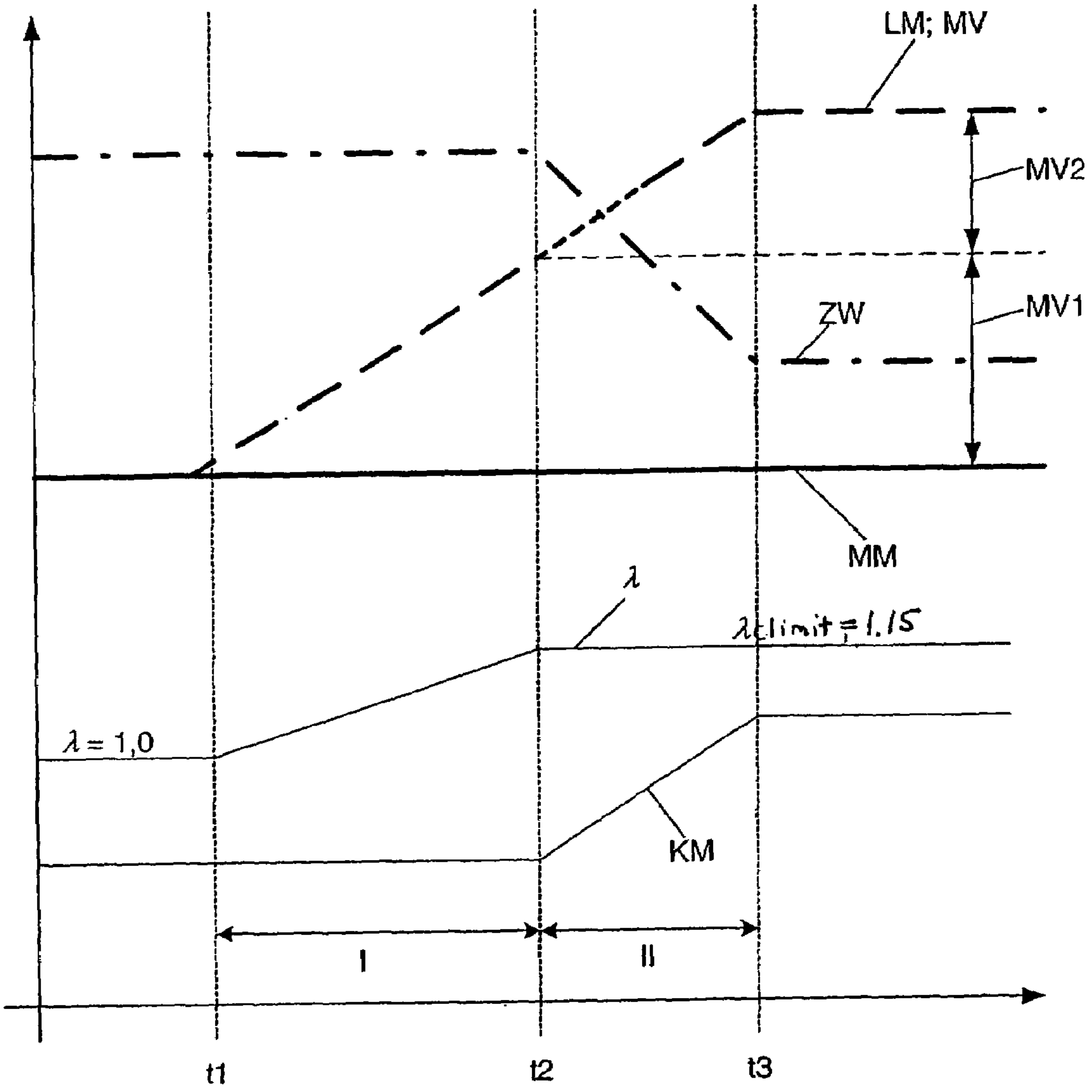
FIG. 1 is a diagram depicting the construction of a torque reserve, according to the invention, by way of schematic connections between the various operating variables.

In FIG. 1, the line MM shows the characteristics of the existing torque of an internal combustion engine (engine torque) as a function of time. The line ZW shows the characteristics of the ignition angle as a function of time. The line KM shows the characteristics of the standby fuel mass as a function of time. The line λ shows the characteristics of the air-to-fuel ratio as a function of time. And, the line LM shows the characteristics of the standby air mass as a function of time. In this context, the characteristics of the air mass LM are analogous to the characteristics of the torque reserve MV to be generated. The inventive generation of a torque reserve for an Otto engine operating in a homogeneous mode shall be explained below with reference to the connections depicted in FIG. 1.

Proceeding from a stationary engine torque MM, e.g., in idle speed mode of an internal combustion engine, the air mass LM is increased at time t1 in order to generate a first torque reserve MV1 at constant fuel mass KM. The result is a leaning of the mixture of air and fuel. A leaning of the air-fuel mixture ensues until at time t2 a predefined mixture ratio lambda λ having a specifiable limit $\lambda_{limit}$ is set. Therefore, in the construction phase I of the torque reserve—in the period between t1 and t2—, a first torque reserve MV1 is constructed without changing the actual engine torque MM. This first torque reserve MV1 is, in essence, limited by the selection of the limiting value $\lambda_{limit}$ for the mixture ratio lambda λ. In the illustrated example, the predetermined limit $\lambda_{limit}$=1.15. A preferred lambda limit of $\lambda_{limit}$ is in a range $\lambda_{limit}$=1.1 . . . 1.25.

A further development of the invention achieves another torque reserve MV2 in that, proceeding especially from an efficiency-optimized setting, the ignition angle ZW is shifted in the retard direction; and the air mass LM and the fuel mass KM are increased—preferably while holding constant their distribution. In the illustrated embodiment, the generation of the torque reserve—by shifting the ignition angle ZW and, simultaneously, increasing the air mass and fuel mass (another torque reserve MV2)—is linked (seen temporally) to the generation of a torque reserve (first torque reserve MV1) that is realized by leaning the mixture of air and fuel. This is the case merely in one preferred design of the invention. However, the different methods for generating torque reserves may also embody a reverse sequence of events. According to FIG. 1, for a desired torque reserve greater than MV1, the air mass LM and the fuel mass KM are increased uniformly starting from time t2 in a torque reserve construction phase II (in which the limit $\lambda_{limit}$ is achieved) while simultaneously shifting the ignition angle ZW in the retard direction, until the desired additional torque reserve MV2 and thus a desired total torque reserve MV (MV=MV1+MV2) is achieved.

Figure 2:
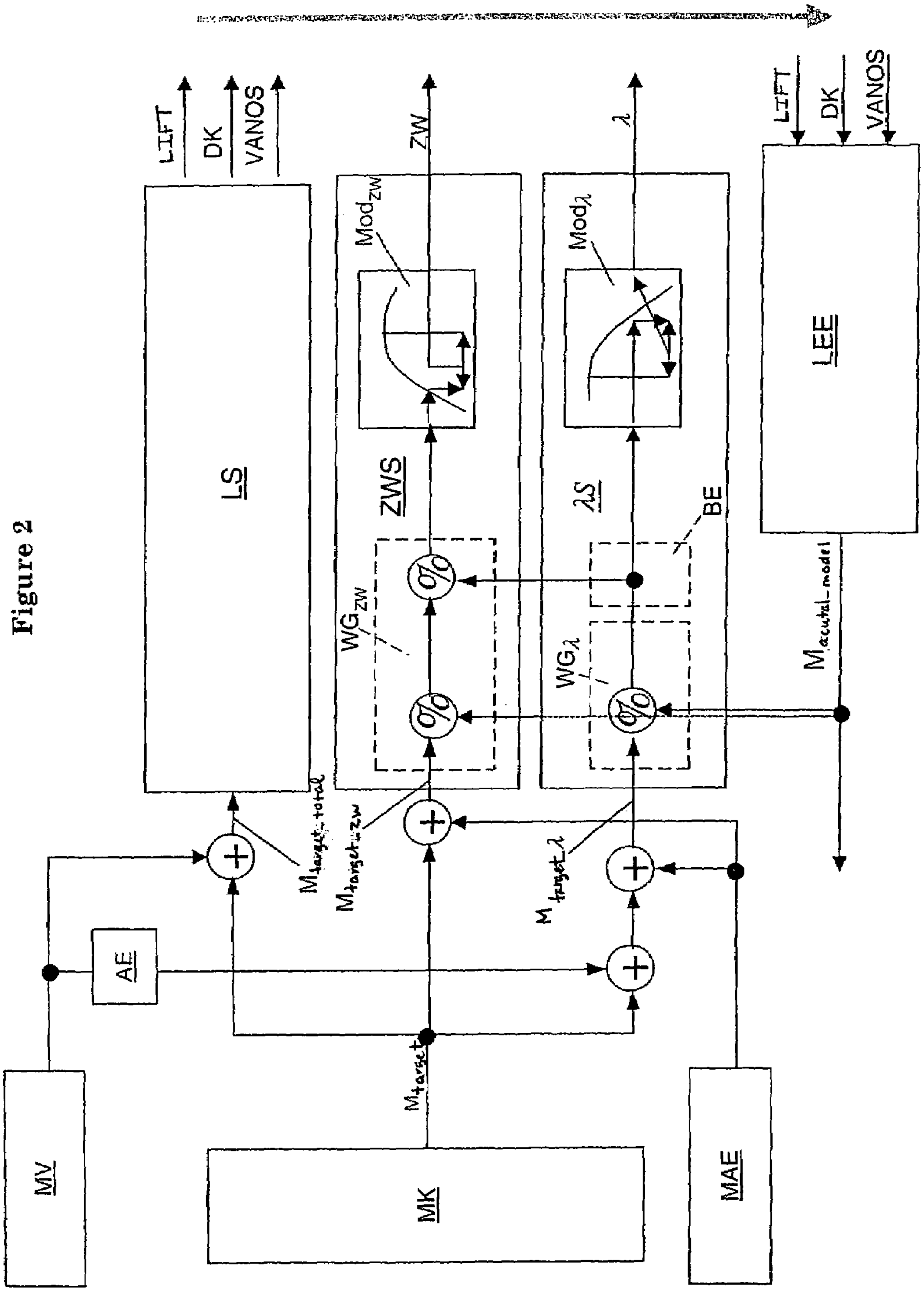
FIG. 2 is a block diagram depicting the construction of a torque reserve having two different torque reserve fractions.

FIG. 2 depicts a preferred operating mode of an open loop or closed loop control system when the torque reserves, generated on the basis of a further development of the invention, are divided. FIG. 2 shows the program control unit for splitting a desired total torque reserve MV into a first torque reserve MV1 and a second torque reverse MV2. In so doing, the first torque reserve MV1 is generated by leaning the air-fuel mixture; and the second torque reserve MV2 is generated by shifting the ignition angle ZW in the retard direction while simultaneously increasing the air mass LM and the fuel mass KM.

To this end, a target torque $M_{target}$ that is necessary owing to the currently existing operating conditions is transmitted to an ignition angle control ZWS and to a lambda control λS by way of a torque coordination unit MK. A total target torque $M_{target\_total}$, resulting from the target torque $M_{target}$ and a desired torque reserve MV, is transmitted to a superordinate load control unit LS. Owing to the desired total target torque $M_{target\_total}$, a necessary air mass LM is determined via the load control unit LS and is set by way of actuating the valves (valve lift LIFT), the throttle flap (throttle flap position DK), the cam shaft (cam shaft position VANOS) and, if desired, other engine components. Merely increasing the air mass LM alone, starting after time t1, still does not result in an increase in the output torque MM of the engine.

The increase in the air mass LM is monitored; and after a time t2, at which a predetermined ratio of the air-fuel mixture and thus a predetermined leaning limit is achieved, the fuel mass KM is also increased at the same time as the air mass LM is further increased. And, at the same time, the ignition angle ZW is also shifted in the retard direction. This takes place until the total torque reverse MV is achieved at time t3. Even in this further development of the invention the shift of the ignition angle in the retard direction does not result at any time in an increase in the output torque MM of the engine—but rather merely in an increase in the torque reserve MV.

The process of splitting the total torque reserve into the first torque reserve MV1, generated by leaning via increasing the air mass, and into the second torque reserve MV2, generated by shifting the ignition angle in the retard direction and by simultaneously increasing the air mass LM and the fuel mass KM, is carried out by way of two interacting efficiency determining devices $WG_{zw}$, $WG_{\lambda}$. In so doing, a first efficiency, resulting from the ratio between the pending target torque $M_{target\_\lambda}$ and an actual torque $M_{actual\_model}$, determined in a load sensing device LEE (preferably exclusively on the basis of the air mass LM that is increased by way of the load control LS), is determined by use of the efficiency determining device $WG_{\lambda}$ of the lambda control λS. A second efficiency, resulting from the ratio between the pending target torque $M_{target\_zw}$ and the calculated actual torque $M_{actual\_model}$, is determined by use of the efficiency determining device $WG_{zw}$ of the ignition angle control ZWS. Then, those fractions of the torque reserve to be generated are split between the lambda control λS and the ignition angle control ZWS as a function of the efficiency that is determined. To determine the ignition angle ZW to be set and the mixture ratio λ to be set, the efficiency determining device $WG_{zw}$ of the ignition angle control ZWS acts on a model $Mod_{zw}$ for determining the ignition angle; and the efficiency determining device $WG_{\lambda}$ of the lambda control λS acts on a model $Mod_{\lambda}$ for determining the respective fractions of fuel.

In the illustrated embodiment, a first torque reserve MV1 of a total torque reserve MV shall be accomplished exclusively by way of the lambda control λS up to a defined limit; only upon a total torque reserve MV that cannot be fulfilled by just MV1 alone, shall the torque reserve that exceeds the limit be realized by the second torque reserve MV2. To this end, the lambda control λS has a limiting unit BE, by which upon reaching an efficiency that is equivalent to the defined limit $\lambda_{limit}$, the current actual efficiency is transferred to the efficiency determining device $WG_{zw}$ of the ignition angle control ZWS; and on reaching the threshold efficiency, the constant threshold efficiency itself is determined. Owing to the transfer of the threshold efficiency from the lambda control λS, that fraction of the total torque reserve that exceeds the first torque reserve MV1 may be generated in the form of MV2 by way of the ignition angle control ZWS. Until this threshold efficiency is reached, an efficiency of the value 1 is always fed by the efficiency determining device $WG_{zw}$ to the ignition angle model $Mod_{zw}$; and thus the efficiency-optimized ignition angle ZW is always sent. Not until the total efficiency, defined by the lambda limit $\lambda_{limit}$ in the lambda control λS, is exceeded, is an invariably fixed efficiency value (the total efficiency value) fed to the efficiency determining device $WG_{zw}$ of the ignition angle control ZWS. Therefore, once the total efficiency, defined in the lambda control λS, has been reached, the efficiency determining device $WG_{zw}$ of the ignition angle control ZWS determines for the ignition angle model $Mod_{zw}$ an efficiency that is not 1, and as a function thereof determines and emits an ignition angle that is shifted accordingly in the retard direction. To generate the second torque reserve MV2, the air mass LM and the fuel mass KM are increased at the same time that the ignition angle is shifted in the retard direction.

A raised torque reserve may be made available for fast use by retrieving the torque reserves—hereinafter by a torque retrieving device MAE—as a function of the desired type of intervention (provision of torque by shifting the ignition angle or provision of torque by way of the lambda control with, if desired, subsequent ignition angle control upon reaching the defined lambda threshold value). In so doing, an additional torque request of a specific amount is sent together with the request of the target torque $M_{target}$, which is pending anyway, to the input of the ignition angle control ZWS ($M_{target\_zw}$) and/or the lambda control λS ($M_{target}$) by way of the torque retrieving device MAE.

Another further development of the invention provides a splitter AE, which feeds proportionally the torque reserve MV, which is to be set, to the ignition angle control or the lambda control λS for at least a specific period of time. In the illustrated example, the splitter AE feeds a fraction of the desired torque reserve MV together with the target torque $M_{target}$ directly to the lambda control λS. In this way, a quasi slow superimposing of the generation of the torque reserve through leaning is achieved in that the generation is first effected by way of the ignition angle control and then, only after the torque reserve request fed forward to the input of the lambda control λS is withdrawn, is the generation of the torque reserve though leaning effected via the lambda control λS. Such a superimposing of the types of torque reserve generation may also be achieved in an alternative manner in that (instead of feeding forward a fraction of the torque reserve to the lambda control λS at the beginning of the control) the limiting unit BE sends, instead of the minimum possible efficiency, a predefined threshold efficiency starting at 100% immediately to the ignition angle control ZWS, and it in turn is returned slowly to the minimum possible efficiency.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for controlling a homogeneously operating internal combustion engine equipped with a control unit which sets an air mass supply, a fuel mass supply, and an ignition angle, the method comprising the acts of:

- beginning from a specific air-fuel ratio of an air-fuel mixture, leaning the air-fuel mixture by increasing the air mass supplied to the air-fuel mixture to generate a first torque reserve; and
- in an event of a positive torque request, increasing the fuel mass supplied to the air-fuel mixture to enrich the air-fuel mixture.

2. The method according to claim 1, wherein the enriching of the air-fuel mixture is performed such that an originally set distribution value is set in a range of λ=1.

3. The method according to claim 1, wherein the air-fuel mixture is leaned by ten to twenty-five percent to provide an air-fuel ratio in a range from λ=1.1 to λ=1.25.

4. The method according to claim 3, wherein the act of leaning the air-fuel mixture by ten to twenty-five percent begins with an air-fuel ratio of λ=1.

5. The method according to claim 3, further comprising the acts of:

- determining a first efficiency via a lambda control resulting from a ratio between a pending target torque and a calculated actual torque;
- determining a second efficiency via an ignition angle control resulting from a ratio between the pending target torque and the calculated actual torque; and
- splitting fractions of the torque reserve to be generated between the lambda control and the ignition angle control as a function of the determined first and second efficiencies.

6. The method according to claim 1, further comprising the act of generating a second torque reserve, beginning from an efficiency-optimized setting, by shifting the ignition angle in a retard direction and increasing the air mass and the fuel mass supplied to the air-fuel mixture.

7. The method according to claim 6, further comprising the acts of:

- determining a first efficiency via a lambda control resulting from a ratio between a pending target torque and a calculated actual torque;
- determining a second efficiency via an ignition angle control resulting from a ratio between the pending target torque and the calculated actual torque; and
- splitting fractions of the torque reserve to be generated between the lambda control and the ignition angle control as a function of the determined first and second efficiencies.

8. The method according to claim 6, wherein the act of increasing the air mass and the fuel mass supplied to the air-fuel mixture is performed while holding constant their distribution in the air-fuel mixture.

9. The method according to claim 8, wherein in an event of a positive torque request greater than the first torque reserve, the method returns the ignition angle to the efficiency-optimized setting in the early direction.

10. The method according to claim 6, wherein in an event of a positive torque request greater than the first torque reserve, the method returns the ignition angle to the efficiency-optimized setting in the early direction.

11. The method according to claim 10, further comprising the acts of:

- determining a first efficiency via a lambda control resulting from a ratio between a pending target torque and a calculated actual torque;
- determining a second efficiency via an ignition angle control resulting from a ratio between the pending target torque and the calculated actual torque; and
- splitting fractions of the torque reserve to be generated between the lambda control and the ignition angle control as a function of the determined first and second efficiencies.

* * * * *